March 22, 1960 R. E. MEYER ET AL 2,929,211
AFTERBURNER IGNITER
Filed July 21, 1958
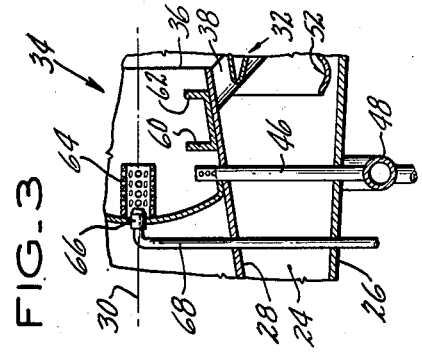
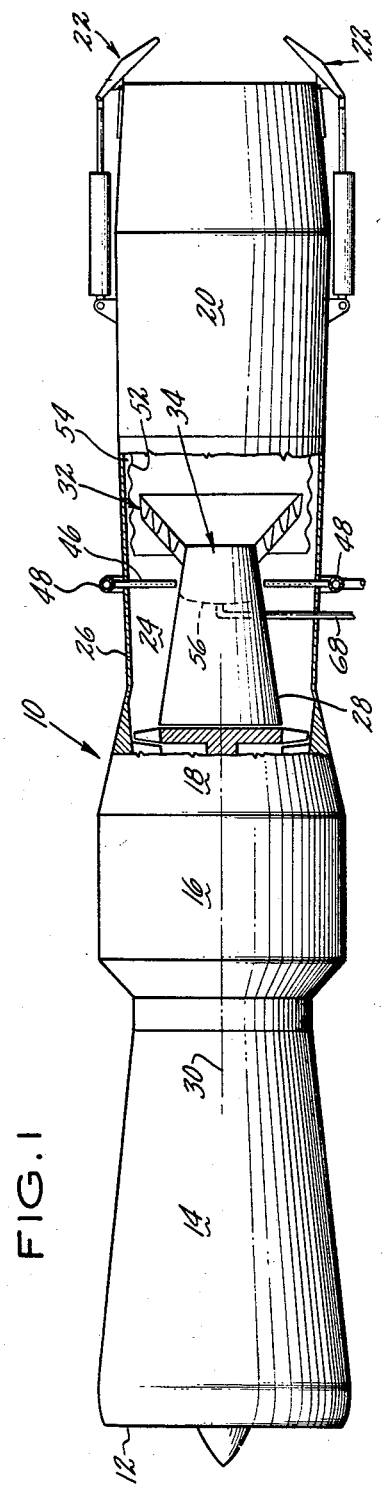
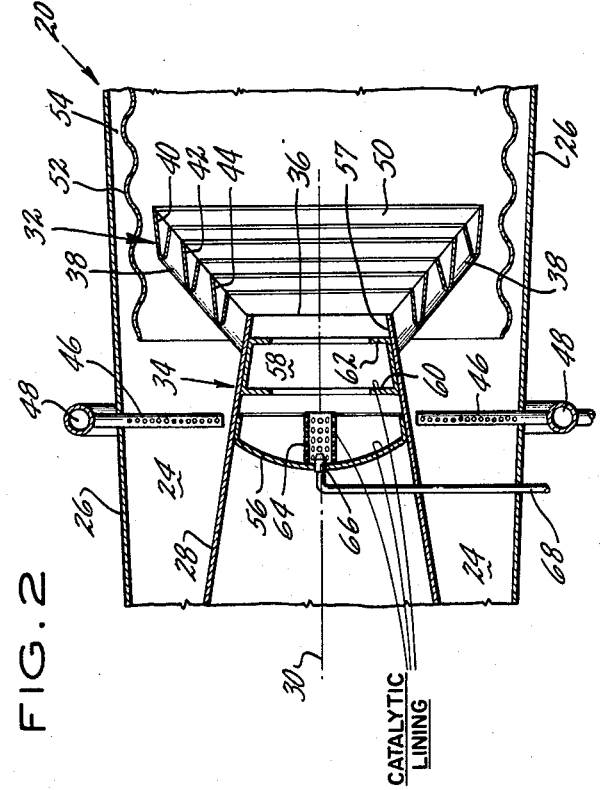
INVENTORS
ROBERT E. MEYER
JOSEPH A. BARLOCK
BY Vernon F. Hauschild
ATTORNEY 2,929,211
Patented Mar. 22, 1960

2,929,211

AFTERBURNER IGNITER

Robert E. Meyer, Glastonbury, and Joseph A. Barlock, Windsor Locks, Conn., assignors to United Aircraft Corporation, East Hartford, Conn., a corporation of Delaware Application July 21, 1958, Serial No. 749,668

1 Claim. (Cl. 60—39.82)

This invention relates to flight constructions and more particularly to ignitors for afterburner type constructions.

It is an object of this invention to teach an afterburner construction which has a fuel ignitor carried by the afterburner inner body after end, which ignitor is provided with an oxidizing catalyst coating to assist in pilot fuel auto-ignition and to further assist in supporting combustion of the main fuel-air mixture.

It is a further object of this invention to teach an afterburner ignitor comprising a rearwardly opening chamber located in the afterburner inner body after end, which chamber has fuel and air flow control means therein and is coated on its inner surface with an oxidizing catalyst to assist in auto-igniting the pilot fuel received therein and which is further provided with main fuel injection means and gas flow stabilizing means in the form of flameholders which coact to provide a main fuel-air mixture adjacent said chamber to be ignited by the pilot fuel and then burned in a combustion zone established downstream of the chamber and flameholders.

Other objects and advantages will be apparent from the specification and claim, and from the accompanying drawings which illustrate an embodiment of the invention.

Fig. 1 is a side view of a typical modern turbojet aircraft engine with afterburner broken away to illustrate our invention in its environment.

Fig. 2 is an enlarged fragmentary showing of our invention in its Fig. 1 environment, partially in section.

While, for purposes of explanation, we will describe our invention as it relates to the afterburner used on a modern turbojet aircraft, it should be borne in mind that the invention taught herein is equally applicable to any reheat system intended for use in any flight powerplant which generates thrust by discharging heated and pressurized exhaust gases to atmosphere.

Fig. 1 shows modern aircraft turbojet engine 10 comprising air inlet section 12, compressor section 14, burner section 16, turbine section 18 and afterburner 20. In the fashion fully described in United States Patent Nos. 2,711,631 and 2,747,367, air enters engine 10 at inlet section 12, is compressed in passing through compressor section 14, is heated in passing through burner section 16, has energy extracted therefrom in passing through turbine section 18 and is then passed through afterburner 20 for reheating therein for ultimate thrust generating discharge to atmosphere through exhaust nozzle 22. For a more complete description of afterburner construction, reference may be had to United States Patent No. 2,780,054, and for a more complete description of exhaust nozzle construction, reference may be had to United States Patent No. 2,836,034. After being discharged from turbine 18, the heated and compressed exhaust gases pass into afterburner 20 through the annular gas passage 24 which is formed between afterburner outer shell 26 and afterburner inner body 28, both of which are preferably of circular cross section and concentric about axis 30 of engine 10. In a manner to be described in greater detail hereinafter, flameholder unit 32 establishes a relatively stagnant combustion zone downstream thereof in which the main fuel-air mixture is burned after being ignited by our afterburner ignitor unit 34.

Our invention is shown in greater particularity in Fig. 2 in which inner body 28 is shown to taper rearwardly or in a downstream direction and to have an open after end 36 to which flameholder unit 32 is attached. Flameholder unit 32 comprises preferably a plurality of substantially radially outwardly extending trough-shaped gutters 38 which open in a downstream direction and are in trough communication with and support a plurality of trough-shaped rings 40, 42 and 44, all of which open in a downstream direction. When atomized main fuel is injected into annular gas passage 24 through main fuel spray bars 46, which are connected to and receive main fuel from a pressurized source, not shown, through manifold 48, a main fuel-air mixture is formed and passed downstream over flameholder unit 32 into combustion zone 50, downstream of flameholder unit 32. In combustion zone 50, due to the vortices formed by flameholder unit 32 and inner body 28, engine gases will be traveling at slow velocities toward, away from and may even be stagnant in relation to flameholder unit 32.

Baffle 52, which is preferably of circular cross section and may be corrugated circumferentially for strength purposes, is concentric with outer shell 26 and forms cooling air flow passage 54 therewith and further serves to keep the burning fuel-air mixture out of contact with load-carrying outer shell 26.

Our ignitor 34 comprises diaphragm 56 which is attached to the interior of and extends across the interior of inner body 28 to prevent the passage of gas therethrough, and coacts therewith to define a rearwardly or downstream opening chamber 58 therewith. Baffles 60 and 62, which are preferably radially inwardly extending rings, are located in and preferably attached to the inner surface 57 of chamber 58 and are contoured to control the flow of air within chamber 58 which will enter chamber 58 from gas passage 24 due to the pressure reduction established downstream of chamber 58 by the passage of engine gases in passage 24 adjacent inner body open after end 36. A shroud member 64, which is preferably of cylindrical shape and perforated, is positioned within chamber 58 concentrically about axis 30 and attached to diaphragm 56. Pilot fuel nozzle 66 projects through diaphragm 56 and is received within shroud 64 and directs a spray of pilot fuel into chamber 58 through perforated shroud 64. Pilot fuel is introduced into pilot fuel nozzle 66 from line 68 which receives pilot fuel from a pressurized source, not shown. The inner surface 57 of chamber 58, together with baffles 60, 62, shroud 64 and diaphragm 56 are coated with an oxidizing catalytic agent, such as platinum-alumine alloys, boron carbide, or a ceramic or other material having properties conducive to promoting the auto-ignition of the pilot fuel and sustaining the combustion of the pilot fuel and the main fuel-air ratio.

It should be borne in mind that main fuel spray bars 46 could be made to extend into chamber 58 to discharge atomized main fuel into chamber 58 solely, as shown in Fig. 3.

During engine operation, pilot fuel is injected into chamber 58 for auto-ignition and continuous combustion therein with the assistance of the coating of the oxidizing catalyst and serves as a pilot flame to ignite the main fuel-air mixture when afterburner operation is desired. When afterburner operation is desired, fuel is injected either into gas passage 24 and/or chamber 58 through spray bars 46 and ignited by the burning pilot fuel within chamber 58. The main fuel-air mixture will be ignited near chamber 58 and, due to the high velocity engine gas flow over flameholder unit 32, the burning fuel-air mixture will pass radially outwardly along trough members 38 and then around the trough rings 40, 42 and 44 for complete combustion downstream thereof in combustion zone 50 of afterburner 20.

In this fashion afterburner ignition is accomplished by utilizing an afterburner ignitor comprising a pilot fuel which is auto-ignited and caused to burn continuously during engine operation within a rearwardly opening, oxidation catalyst coated, chamber formed within the afterburner inner body after end and which serves to ignite the main fuel-air mixture which is either formed within the chamber or passed in close proximity thereto for ignition by the burning pilot fuel or pilot flame.

It is to be understood that the invention is not limited to the specific embodiment herein illustrated and described but may be used in other ways without departure from its spirit as defined by the following claim.

We claim:

An aircraft engine having an afterburner coaxial therewith with an outer shell of circular cross section through which engine exhaust gases are passed for discharge to atmosphere after reheating therein, an inner body of circular cross section and tapering in a downstream direction positioned concentrically within said outer shell to define an annular engine gas flow passage therewith, said inner body having an open downstream end and an internal diaphragm upstream thereof to define a rearwardly opening chamber recessed within said inner body, a perforated cylindrical shroud attached to said diaphragm and concentrically positioned within said chamber, axially spaced ring-shaped flow baffles attached to the interior of said inner body and projecting into said chamber, means to inject a pilot fuel through said shroud into said chamber to be auto-ignited therein, said chamber interior, diaphragm, shroud and baffles having a coating of oxidizing catalyst to assist pilot fuel auto-ignition and combustion, a flameholder over which engine gas from said engine gas flow passage passes to establish a combustion zone downstream thereof comprising a plurality of first downstream opening trough-shaped members attached to and extending substantially radially outwardly while tilted downstream from the downstream end of said inner body with the troughs of said first members joining said chamber to receive burning pilot fuel therefrom and at least one trough-shaped downstream opening ring member concentric with said inner body and connected to said first trough-shaped members with the troughs of said first members joining the trough of said ring member to receive burning pilot fuel therefrom, and means to inject main fuel into said engine to form a main fuel-air mixture with engine gases in said combustion zone, and means to ignite said main fuel-air mixture for burning in reheat fashion.

References Cited in the file of this patent

UNITED STATES PATENTS

| | | |
|---|---|---|
| 2,433,943 | Zwicky et al. | Jan. 6, 1948 |
| 2,639,581 | Cohen | May 26, 1953 |
| 2,658,340 | Cohen | Nov. 10, 1953 |
| 2,771,743 | Lovesey | Nov. 27, 1956 |

FOREIGN PATENTS

| | | |
|---|---|---|
| 696,756 | Great Britain | Sept. 9, 1953 |